United States Patent

Hartfiel et al.

[11] Patent Number: 5,967,796
[45] Date of Patent: Oct. 19, 1999

[54] PCI BUS CABLE INTERFACE

[75] Inventors: John Wayne Hartfiel, Austin, Tex.; Adron Marcus Washington, Lake Charles, La.

[73] Assignee: International Business Machines Corporation, Armonk, N.Y.

[21] Appl. No.: 09/027,794

[22] Filed: Feb. 23, 1998

[51] Int. Cl.[6] .................................................. H01R 9/09
[52] U.S. Cl. ............................................. 439/61; 361/785
[58] Field of Search .............................. 439/61, 65, 505; 361/785

[56] References Cited

U.S. PATENT DOCUMENTS

| | | | |
|---|---|---|---|
| 5,199,881 | 4/1993 | Oshita et al. | 439/65 |
| 5,338,207 | 8/1994 | Linberry et al. | 439/65 |
| 5,473,242 | 12/1995 | McKenna | 439/80 |
| 5,488,541 | 1/1996 | Mistry et al. | 439/61 |
| 5,558,522 | 9/1996 | Dent | 439/65 |
| 5,785,533 | 7/1998 | Baitz et al. | 439/61 |

*Primary Examiner*—Neil Abrams
*Assistant Examiner*—J. F. Duverne
*Attorney, Agent, or Firm*—Casimer K. Salys; Jack V. Musgrove; Andrew J. Dillon

[57] ABSTRACT

An interface cable which allows access to an operational Peripheral Component Interconnect (PCI) bus compatible circuit board is disclosed. A flat flexible cable (30,72) secures a plurality of connectors (50,32,36,38) at substantially equal intervals. The connectors on the flat cable are adapted to receive a connection (62,63,64,66,68) on a first edge of the PCI compatible circuit board (82,90). When the PCI compatible circuit board is plugged into the flat flexible cable, a second edge of the PCI compatible circuit board which is opposite the first edge is free to move laterally, away from neighboring circuit boards in response to a flexing of the flat flexible cable. Open space is created adjacent to the PCI compatible circuit board allowing sufficient access to surfaces of the functioning PCI compatible circuit board for testing purpose.

14 Claims, 4 Drawing Sheets

PCI BUS CABLE INTERFACE

BACKGROUND OF THE INVENTION

1. Technical Field

The present invention relates in general to an improved method and system for providing a peripheral component interconnect (PCI) bus utilizing a flat cable. In particular, the present invention relates to an improved method and system for interconnecting PCI compatible printed circuit boards while allowing easy access to the surfaces of those circuit boards during testing and development. Still more particularly, the present invention relates to an improved method and system for providing access to PCI circuit boards during testing while simulating an electrical environment which is virtually identical to actual operating conditions.

2. Description of the Related Art

Modern computers utilize data buses to move data from one area of the computer to another. A modern computer has multiple data buses which interconnect different components of the computer system. Computer buses typically are implemented by a series of copper lines within a printed circuit board generally referred to as "traces."

A computer data bus is essentially a shared highway that interconnects different components of a computer system, including a microprocessor, disk-drive controller, memory, and input/output ports. Buses are characterized by the number of bits of data they can transfer at a single time (e.g., an 8-bit data bus simultaneously transfers 8 bits of data in parallel; a 16-bit data bus simultaneously transfers 16 bits in parallel). The bus is integral to internal data transfer. Bus (computer), Microsoft® Encarta® 96 Encyclopedia. © 1993–1995 Microsoft Corporation. All rights reserved.

Modern personal computers have specialized data buses to maximize operational efficiency. High performance data buses within modern personal computers are specialized for interconnecting transaction intensive sub-systems. Generally, buses coupled directly to the main processor transfer data at a higher rate than peripheral buses. High speed buses require special design considerations to ensure system integrity.

Industry standards for bus architectures have been created by organizations within the computer industry. One such architecture which is gaining popularity is an architecture containing a "PCI bus." The PCI bus specification was derived from provisions introduced by Intel® Corporation. The Intel® provisions detail a local bus system for a personal computer. A PCI-compliant circuit cards can operate in a computer built to PCI standards. The PCI specification is continually being reviewed by computer industry committees such as the "PCI Special Interest Group."

An operational PCI local bus requires a PCI controller card to regulate bus utilization. Typically, the PCI controller card is installed in one of the PCI card receiving sockets. The PCI controller can exchange data with the computer's central processor, simultaneously transferring either 32 bits or 64 bits of data, depending on the implementation. A PCI controller additionally allows intelligent PCI-compliant adaptors to perform tasks concurrently with the CPU utilizing a technique called "bus mastering." The PCI specification also allows for multiplexing. Microsoft Press Computer Dictionary 295 (2ed. 1994).

Another bus standard is an industry standard bus. A PCI bus is a higher level or faster bus than the Industry Standard (ISA) bus. An ISA bus is typically utilized to interconnect a keyboard to the computer system, whereas a PCI bus typically interconnects devices requiring faster communication, such as disk drives and communication interfaces.

Due to the high data rate on a PCI bus, the physical interconnection of PCI-compliant circuit boards is critical. Transmission line properties such as interference susceptibility, impedance and length are critical to ensure bus communication integrity.

Computers built to PCI specifications can be upgraded or enhanced by adding PCI-compliant circuit cards. A PCI-compliant circuit board is often referred to as a "PCI card" by those skilled in the art.

Printed circuit boards which are sold to consumers generally have been subjected to extensive development and testing prior to their sale. The development phase of a printed circuit board can be very expensive. Design and production defects which avoid detection due to inadequate test capabilities can substantially add to the cost of a product. Production delays due to insufficient testing resources further add to the cost of a product.

A conventional personal computer contains a "motherboard" which provides internal buses to interconnect a main processor with other sub-systems of the computer. The motherboard is the main circuit board containing the primary components of the computer system.

A PCI circuit board undergoing a thorough development procedure must be electrically connected to an operational computer system. Due to the compactness of motherboards and rigid PCI bus specifications, PCI connectors are typically located close together on a motherboard. Visual access, as well as physical access to electrical signals during operation of PCI compatible circuit boards may be extremely limited.

Access to desired locations on a PCI circuit card during a test which utilizes a motherboard requires that the PCI card be remotely located from the motherboard. Testing typically requires an extension cable or an adaptor cable. For example, extension cables can be plugged into the motherboard and the PCI card, then the PCI card can be placed in a location which provides full access.

Alternately, special devices such as extender circuit boards can be plugged into a PCI card receiving socket to extend a duplicative connector at a location above surrounding PCI cards. An extender card places the board under test above surrounding obstructions and allow access to signals on the PCI card.

Often, initial PCI card design concepts are hand-wired by technicians. Typically, hand wired prototype circuit boards are physically much larger than allowed by the PCI specification. Hence, many conceptual designs will not fit in a conventional motherboard environment due to space constraints.

A commonly utilized development tool is a PCI extender card having right angle connectors. Extender cards with right angles provide access to signals on the top side of the PCI compatible circuit board, however, access to signals on the underside of the PCI card is again limited. Further, only one right angle extender card per system can be attached to the motherboard.

Generally, each party to the development of a PCI card has different requirements. Hence, a large quantity of application specific extender cards or test fixtures are built during the development of a product. Often, an application specific test fixture is useless after completion of the development of a specific PCI card.

Extender cards and test fixtures add to the cost of product development. Additionally, the added transmission line lengths introduced by adaptor cables and/or extender cards can create phenomena which is not present when the PCI card is plugged directly into a motherboard.

More particularly, card extenders or adaptors may degrade the signal quality on the PCI bus. Cables having excessive lengths induce data transfer problems, particularly timing skew and interference.

Currently, in the development of PCI compatible circuit boards, the circuit boards must operate in an electrical environment which is different from the electrical environment found in actual field operation. Often, not all of the design problems and difficulties can be determined utilizing extender cards and/or adaptor cables. Additionally, problems manifest in the development of PCI circuit cards which are a result of the test environment.

It therefore should be obvious that there is a need for a system and method for allowing access to the surface of a PCI compatible circuit board during operational testing. Further, a need exists for a reusable test fixture which accommodates oversized PCI compatible circuit boards. Additionally, it has become apparent that adequate testing of a PCI compatible card requires a test environment which accurately simulates field operating conditions.

SUMMARY OF THE INVENTION

It is therefore one object of the present invention to provide an improved method and system for providing a peripheral component interconnect (PCI) bus utilizing a flat cable.

It is another object of the present invention to provide an improved method and system for interconnecting PCI compatible printed circuit boards while allowing easy access to the surfaces of those circuit boards during testing and development.

It is yet another object of the present invention to provide an improved method and system for providing access to PCI circuit boards during testing while simulating an electrical environment which is virtually identical to actual operating conditions.

The foregoing objects are achieved as is now described. An interface cable which allows access to an operational Peripheral Component Interconnect (PCI) bus compatible circuit board is provided. A flat flexible cable secures a plurality of connectors at substantially equal intervals. The connectors on the flat cable are adapted to receive a connector on a first edge of the PCI compatible circuit board. When the PCI compatible circuit board is plugged into the flat flexible cable, a second edge of the PCI compatible circuit board which is opposite the first edge is free to move laterally, away from neighboring circuit boards in response to a flexing of the flat flexible cable. Open space is created adjacent to the PCI compatible circuit board allowing sufficient access to surfaces of the functioning PCI compatible circuit board for testing purposes.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of illustrative embodiment when read in conjunction with the accompanying drawings, wherein:

DETAILED DESCRIPTION OF ILLUSTRATIVE EMBODIMENT

Figure 1:
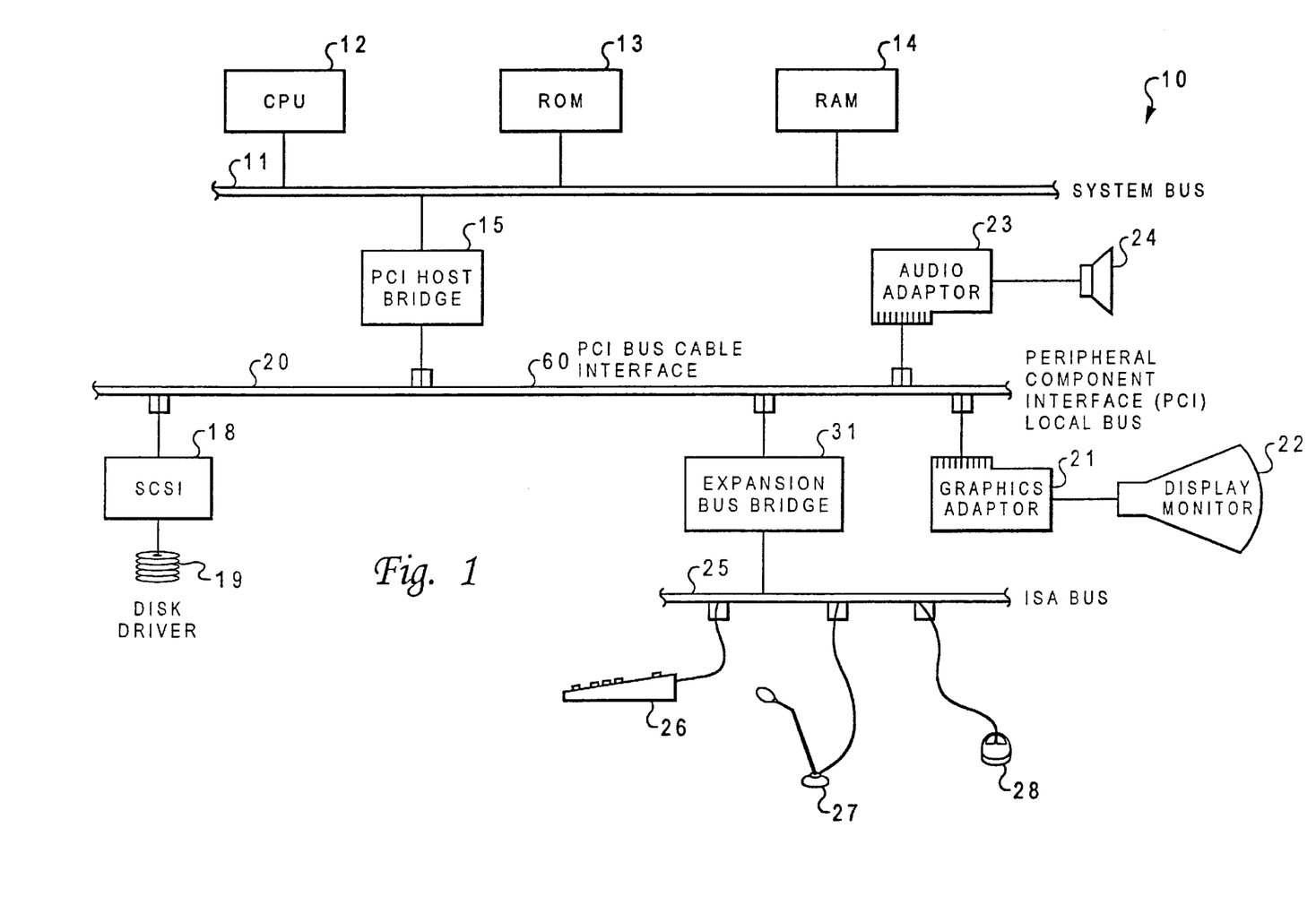
FIG. 1 depicts a representative computer architecture having three data buses, including a PCI bus.

With reference now to the figures and in particular with reference to FIG. 1, there is depicted a basic computer data bus architecture of a modern personal computer system. PCI bus cable interface 60 can be utilized by computer system 10 to provide a PCI local bus. As depicted, a central processing unit (CPU) 12, a read-only memory (ROM) 13, and a random access memory (RAM) 14 are connected to a system bus 11 of a computer system 10.

CPU 12, ROM 13, and RAM 14 are also coupled to a PCI local bus 20 of computer system 10 through a PCI host bridge 15. PCI host bridge 15 provides a low latency path through which CPU 12 may directly access PCI devices that are mapped within bus memory and/or input/output (I/O) address spaces. PCI host bridge 15 also provides a high bandwidth path allowing devices coupled to PCI local bus 20 to directly access RAM 14. PCI host bridge 15 is commonly referred to as a PCI bus controller or a PCI host card.

In addition, any PCI compatible circuit board may be connected to PCI local bus 20. An audio adaptor 23 may be attached to PCI local bus 20 for controlling audio output to speaker 24. A graphics adaptor 21 may be attached to PCI local bus 20 for controlling the graphical output to display monitor 22. Also attached to PCI local bus 20 is a small computer system interface (SCSI) 18. SCSI 18 is utilized to control high-speed SCSI disk driver 19. A communications adaptor (not illustrated) may also be connected to PCI local bus 20 to allow connection to other computers. As illustrated, a PCI bus supports highly desirable features within a computer system.

A PCI-to-ISA bus bridge, such as an expansion bus bridge 31 may be utilized for coupling an ISA bus 25 to PCI local bus 20. As depicted, a keyboard 26, a microphone 27, and a mouse 28 may be coupled to ISA bus 25 for performing certain basic user I/O functions. Typically, an interface adaptor (not illustrated) is required for keyboard 26, microphone 27, or mouse 28 to interface ISA bus 25. Generally, user I/O functions do not require the high data rate which SCSI 18 and disk driver 19 require to operate effectively.

Although the illustrated exemplary embodiment describes a PCI local bus 20 and an ISA bus 25, the present invention is not limited to the depicted bus architectures. In an alternate configuration, the present invention could be adapted to provide an ISA bus for computer system 10. Additionally, the illustrated PCI compatible circuit boards are a subset of possible combinations and the depicted PCI cards should not be construed to limit the scope of the invention. Rather, the present invention could be utilized by different variations of PCI cards, different bus interconnections and different bus configurations.

FIG. 1 depicts an architecture commonly utilized in a modern personal computer. A subset of the depicted computer elements or a state-of-the-art, sophisticated computer system could utilize the present invention. FIG. 1 should not be construed in a limiting sense as it is only one representative model of a system which could be utilized in cooperation with the present invention.

Figure 2:
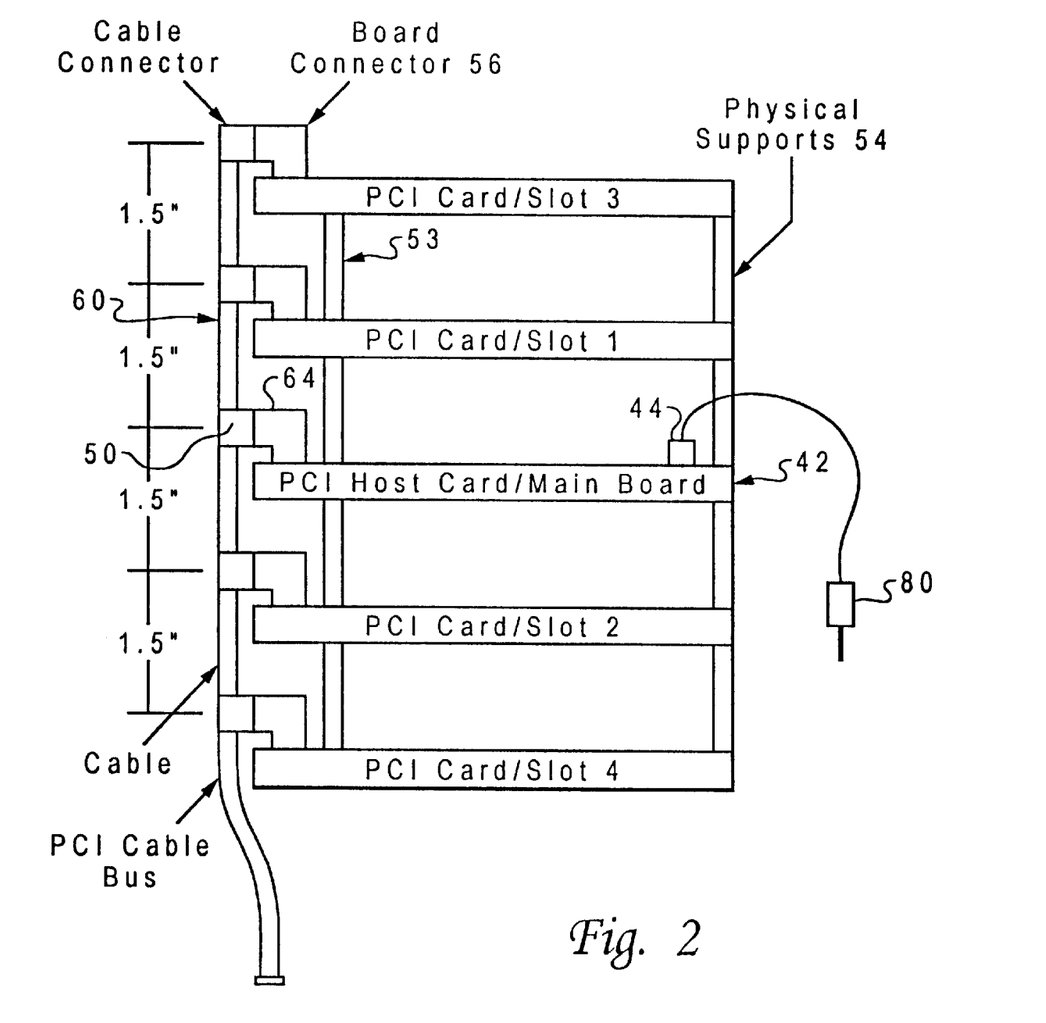
FIG. 2 illustrates a side view of an interface cable in accordance with the present invention.

Referring to FIG. 2, a side view of PCI bus cable interface 60 is depicted. PCI bus cable interface 60 is illustrated interconnecting PCI compatible circuit cards. PCI bus cable interface 60 is particularly effective in a product development environment because it allows circuit board accessibility. Additionally, the present invention is useful for non-conventional purposes, such as accommodation of oversized circuit boards. Further, the present invention provides an electrical environment which is virtually identical to field operating conditions. Field operating conditions are conditions or the environment which the PCI card is subjected to by a consumer or an end user.

PCI bus cable interface 60 provides PCI bus controller connector 1 50 and PCI bus controller connector 2 64 for insertion of PCI bus controller circuit card 42. PCI bus controller circuit card 42 contains a processor which serves as a PCI host/master for PCI bus cable interface 60.

In a preferred embodiment, PCI bus controller circuit card 42 can emulate computer system 10 of FIG. 1. In this embodiment, PCI bus controller circuit card 42 can specifically test or exercise a single PCI circuit card without interconnection to a computer system. Alternately, PCI bus controller circuit card 42 can act as a bridge such as PCI host bridge 15 of FIG. 1. PCI bus controller circuit card 42 can be configured to communicate with any bus of a computer system, such as system bus 11.

Bridging can be accomplished utilizing connector 44. Adaptor cable 80 provides interconnection from a computer system bus to PCI bus controller circuit card 42 through connector 44. Another embodiment removes PCI bus controller circuit board 42 from PCI bus cable interface 60 and places adaptor cable 80 directly into PCI bus controller connector 1 50. In this embodiment, the bridge function must reside elsewhere in the system, typically within the motherboard.

The illustrated embodiment of the present invention depicts 4 PCI circuit card sockets or interfaces. A preferred embodiment of PCI bus cable interface 60 interconnects 4 PCI cards utilizing 4 pairs of connectors. Each PCI card is plugged into two connectors.

Further embodiments could contain additional PCI circuit card sockets. The quantity of PCI circuit card interfaces illustrated, is not to be construed as a limiting feature of the invention.

Physical supports 53 and 54 can be utilized to stack or arrange PCI cards in a semi-rigid configuration. A semi-rigid configuration is important when PCI cards are operational. Without physical supports 53 and 54, PCI cards could potentially touch, creating short circuits between the circuit cards. Physical supports 53 and 54 give rigidity to the cable bus system of the present invention when a fixed configuration is desired.

Figure 3:
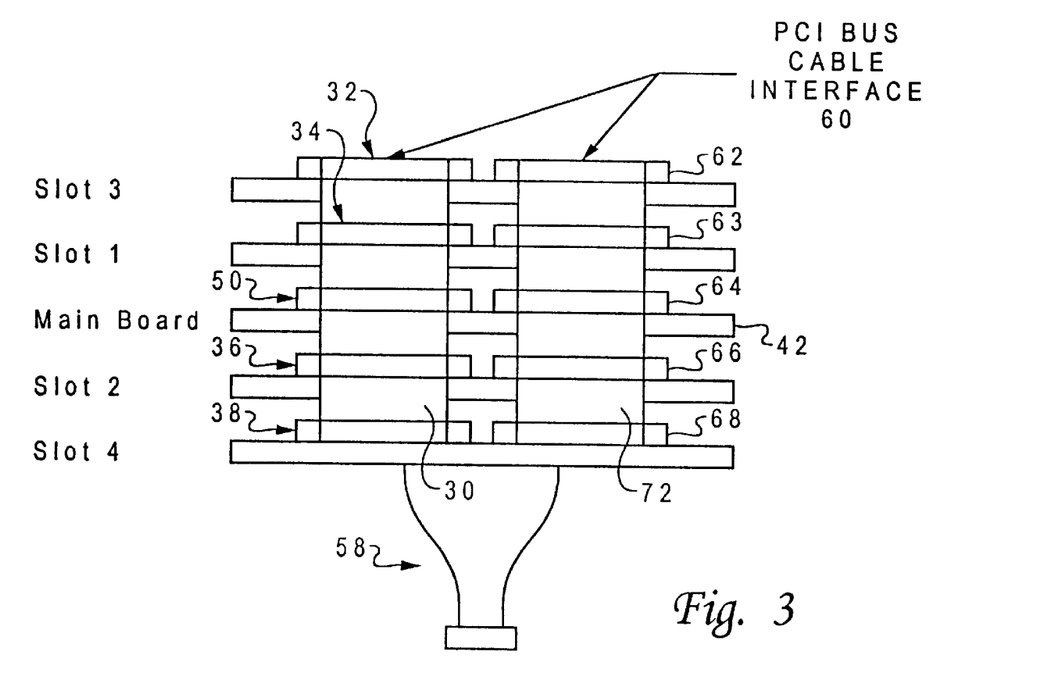
FIG. 3 depicts a rear view of the interface cable of FIG. 2.

Referring to FIG. 3, a rear view of PCI bus cable interface 60 is illustrated. A preferred embodiment of the present invention utilizes connectors 32, 34, 36, 38 and PCI bus controller connector 1 50 to accept PCI compliant circuit boards. Connectors 32, 34, 36, 38 and PCI bus controller connector 1 50 are mounted on a high quality stranded flat cable 1 30 having 30 gauge wire with 0.025 inch wire spacing. Connectors 62, 63, 66, and 68 and PCI bus controller connector 2 64 are mounted on stranded flat cable 72.

The spacing of connectors 62, 63, 66, and 68 and PCI bus controller connector 2 64 is substantially identical to the spacing of connectors 32, 34, 36, 38 and PCI bus controller connector 1 50. Although two cables are preferred to implement the present invention, a single cable could be utilized to implement the present invention. Flat cable 1 30 and flat cable 2 72 are commonly referred as a "ribbon cable" due to their flat profile.

PCI bus cable interface 60 complies with the majority of the electrical parameters of the PCI local bus specification rev 2.1, (Jun. 1, 1995). However, PCI bus cable interface 60 does not comply with many of the physical requirements of the specification.

In a preferred embodiment of the present invention, the pinout and connector definition differ significantly from the PCI specification. The PCI specification requires a card edge connector and PCI bus cable interface 60 utilized a right angle "pinned connector." However, an adaptor connector can be utilized to connect PCI cards having a card edge connector to PCI bus cable interface 60. The spacing of the circuit boards and the placement of the connector also deviate from the PCI specification. The specified maximum continuous supply current in the PCI specification is higher than PCI bus cable interface 60 can reliably withstand utilizing 30 gauge conductors.

If the PCI compatible cards to be utilized by PCI bus cable interface 60 require more than ½ of an amp per wire, it is preferred that power is supplied from an auxiliary power cable. However, PCI cards continue to have lower power consumption and currently very few, if any, PCI cards will exceed the power capabilities of the present invention. Printed circuit boards which are compliant with the signal parameters of version 2.1 of the PCI specification can be effectively tested by the present invention.

Oversized cards can be accommodated by the present invention. Oversized cards would typically be early development prototypes, possibly hand wired implementations.

Connectors 32, 34, 36, 38, 62, 63, 66, and 68 receive PCI compatible circuit cards. PCI bus controller connector 1 50 and PCI bus controller connector 2 64 receive PCI bus controller circuit card 42. An acceptable connector for implementation of connectors 32, 34, 36, 38, 62, 63, 66, 68, PCI bus controller connector 1 50 and PCI bus controller connector 2 64 would be a MOLEX® P/N 15-92-3080. Adjacent connectors are mounted proximate to each other to provide a simulated motherboard environment.

In a preferred embodiment, adjacent connectors are mounted approximately 1.5 inches apart on flat cable 1 30 and flat cable 2 72 for a total cable length of approximately 6 inches. Closer proximity of connectors on the cable is possible with the present invention, however, shorter than normal spacing would limit access to the circuit board edge adjacent to the cable connectors. It is also preferred all that connectors are aligned with pin 1 orientated in a consistent configuration.

Connectors on PCI bus cable interface 60 are oriented to mate with right angle circuit board connectors such as connector 56 of FIG. 2. An acceptable circuit board connector for utilization in conjunction with the present invention would be a MOLEX® P/N 71661-2080.

Specific conductors on PCI bus cable interface 60 are unique to a particular PCI card location. To ensure correct operation of the PCI bus system, strict adherence to the position-sensitivities of PCI bus cable interface 60 is required.

The PCI bus specification defines a system for automatic detection of PCI card installation. In a motherboard environment position-sensitivities are not critical because automatic configurations of PCI card receiving slots can be performed by the CPU.

It is preferred that flat cable 1 30 and flat cable 2 72 have a characteristic impedance of approximately 80 ohms. An acceptable flat cable is a TEMP-FLEX® P/N F3001S80-025-85. However, any 80 conductor flat cable utilizing 30 gauge wire, employing a 0.025 inch wire spacing and having an impedance of 85 ohms would perform for the present invention.

The PCI bus specification defines several implementations of a PCI bus. Specifically, a 32 bit bus having a 5 volt or a 3.3 volt signaling environment and a 64 bit bus having a 5 volt or a 3.3 volt signaling environment. PCI bus cable interface 60 can be altered to support both a 32 bit and a 64 bit implementation. PCI bus cable interface 60 can accommodate a 5 volt without modification. However, a 3.3 volt signaling environment might require a larger wire size.

If PCI cards to be tested have high power consumptions or a 3.3 volt signaling environment, a flat cable with a larger wire gauge could be selected. The flat cable defined herein is intended for a 5 volt signaling environment. While 3.3 volts are supplied in a 5 volt signaling environment, cable utilizing 30 gauge wire is not physically capable of safely providing the current required by the PCI specification for the 3.3 volts signaling system.

The hardware utilized in the present invention is common and inexpensive. Further, assembly of PCI bus cable interface 60 is also very inexpensive. If additional power is required by a PCI circuit card, or the amount of required current exceeds the preferred cables capacity, power can be provided from an external power source via power cable 58.

Typically, a motherboard supplies power to each PCI card. The PCI bus specification defines details of PCI card power sensing on the PCI bus. The PCI circuit board provides a power consumption signal called a "present" signal to the CPU. The present signal can be utilized by the CPU to determine total power consumption on the PCI bus.

In the present invention, the PCI compatible circuit board "present" signal is not necessary. The power for PCI cards is supplied by PCI bus controller circuit card 42 via the PCI bus cable interface 60. Additionally, there are no requirements for power consumption detection hardware or software support when utilizing a preferred embodiment of the present invention.

A preferred embodiment of PCI bus cable interface 60 minimizes cable lengths in an attempt to optimize the transmission qualities of the cable. Minimizing cable lengths ensures a minimal time for the signals to propagate from connector to connector. Additionally, minimal cable lengths minimize distortion problems.

A PCI cable length which meet the PCI specification requirements can be determined utilizing the rise time and the propagation delay time for a specified cable conductor length. An approximate range for the minimum and maximum total length of PCI bus cable interface 60 has been determined to be 5.1 to 28.4 inches. In the present invention, proximate connector spacing of 1.5 inches is provided to create minimal detrimental transmission line effects due to line length. Spacing the PCI connectors at short, equal intervals creates loads that act as individual stubs on a transmission line.

Proximate spacing of connectors on the PCI cable prevents the data bus from becoming a cumulative lump load and creating impedance mismatches. A cumulative lump load can create undesirable interference. A preferred embodiment of the present invention provides a total cable length of approximately 6 inches.

Clock signals which are transmitted on PCI bus cable interface 60 are more susceptible to degradation than data signals. Clock signals can be effected by cable length and impedance mismatches. Particularly, PCI clock signals are sensitive to line lengths and line impedances. To minimize the overall signal degradation for clock signals, PCI bus controller connector 1 50 has been placed in the center location of PCI bus cable interface 60.

According to the PCI specification, a two nanosecond skew between any of the clock signals at the receiving circuit can cause operational difficulties. In the present invention, circuit board traces on PCI bus controller circuit card 42 which carry clock signals to PCI bus controller connector 1 50 have lengths which complement the length of the adaptor cable.

It is preferred that conductors on PCI bus controller circuit card 42 are implemented to provide an identical overall length from source to destination for all clock signals. Thus, the length of the transmission line from the clock source on PCI bus controller circuit card 42 to the PCI circuit board clock receiving circuit remains a constant dimension regardless of PCI card location. Flat cable 1 30 provides a different transmission line length for different PCI cards locations. Therefore, PCI bus controller circuit card 42 provides extra line length on the circuit card to complement the transmission line lengths which are shorter on flat cable 1 30 and flat cable 2 72.

Utilizing PCI cards having consistent clock signal transmission line lengths from connector to the receiving circuit ensures that the total clock signal transmission line lengths remain equal. Equal transmission line lengths minimize skew between clock signals at their destination.

It is preferred that PCI cards terminate the clock lines with a 80 ohm load impedance. The present invention attempts to minimize impedance mismatches throughout the system. However, proper bus termination impedances on the circuit cards are vital to superior operation. Continuity in transmission line and termination impedances ensures minimal reflection of propagating signals at the terminations.

Additionally, in order to obtain the maximum clock signal quality, the clock signals on PCI bus cable interface 60 have been positioned between two ground conductors.

Figure 4:
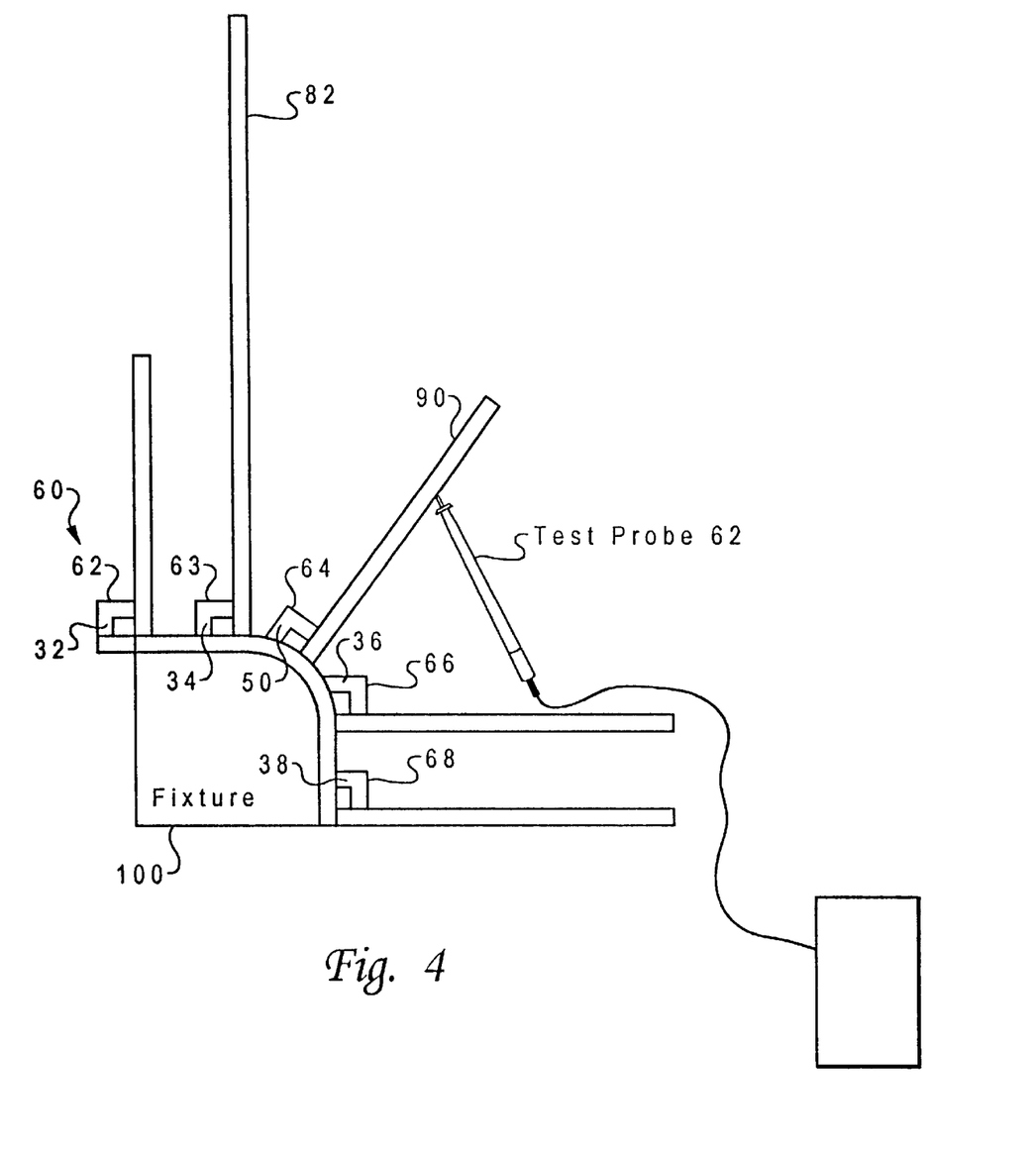
FIG. 4 illustrates how the interface cable depicted in FIG. 2 can be flexed to allow access to the surface of operational PCI compatible printed circuit boards.

Referring to FIG. 4, PCI bus cable interface 60 is illustrated in association with fixture 100. The intervals between connectors 32, 34, 36, 38, 62, 63, 66, 68, PCI bus controller connector 1 50 and PCI bus controller connector 2 64 allow PCI bus cable interface 60 to bend or flex exposing both sides of PCI compatible circuit board 90.

Bending PCI bus cable interface 60 at different locations allows exposure to different PCI cards. Every PCI card can be adequately accessed by flexing PCI bus cable interface 60 in the appropriate location. The present invention provides an improved access to signals on PCI cards during operational tests of the circuits boards due to the flexing of PCI bus cable interface 60 and proper connector spacing.

Critical spacing of connectors allows for access to test points by test probe 62. Oversized PCI compatible circuit board 82 is depicted to illustrate how PCI bus cable interface 60 can easily accommodate development hardware. Further, PCI bus cable interface 60 is not application specific, is inexpensive and can be utilized through the development of many circuit board designs.

Connector spacing of 1.5 inches has been determined to be an optimum connector interval to provide field simulation and adequate access to signals on PCI compatible circuit boards.

The PCI bus specification dictates specific signals for utilization at unique connector locations. To provide for utilizing PCI cards in any location, it is recommended that auxiliary switches be located on PCI compatible circuit boards to provide a manual configuration for each PCI card. This allows the installation of a PCI card into any location and further enhances the utility of PCI bus cable interface 60.

While the invention has been particularly shown and described with reference to a preferred embodiment, it will be understood by those skilled in the art that various changes in form and detail may be made therein without departing from the spirit and scope of the invention.

What is claimed is:

1. An interface cable for allowing access to a surface of an operational Peripheral Component Interconnect (PCI) bus compatible circuit board, said PCI bus compatible circuit board having a first edge and a second edge opposite said first edge, said interface cable comprising:

at least one flat flexible cable; and a plurality of connectors attached to said at least one flat flexible cable, said plurality of connectors proximate to each other and adapted to receive a connector on said first edge of said PCI bus compatible circuit board, such that flexing of said flat flexible cable allows said second edge of said PCI bus compatible circuit board to move away from adjacent circuit boards which are attached to said interface cable, wherein said flexing of said flat flexible cable creates open space adjacent to said PCI bus compatible circuit board and allows access to surfaces of said PCI bus compatible circuit board in an operational environment, and wherein a center most connector is configured to receive a PCI bus controller printed circuit board to minimize a transmission line length along said flexible cable for each connector.

2. The interface cable of claim 1, wherein said plurality of connectors are spaced approximately at 1.5 inch intervals.

3. The interface cable of claim 1, further comprising supports for stacking said PCI compatible circuit board in a rigid configuration.

4. The interface cable of claim 1, further comprising a fixture to support said at least one flat flexible cable while said second end of said PCI compatible circuit board is moved away from said adjacent circuit boards and access is created.

5. The interface cable of claim 1, wherein said at least one flat flexible cable is comprised of a first flexible cable and a second flexible cable.

6. The interface cable of claim 5, wherein said first flat flexible cable has approximately an 80 ohm impedance.

7. The interface cable of claim 5, wherein said first flat flexible cable has 80 conductors.

8. The interface cable of claim 7, wherein said second flat flexible cable has approximately an 80 ohm impedance.

9. The interface cable of claim 5, wherein said second flat flexible cable has 80 conductors.

10. The interface cable of claim 5, wherein said first interface cable is coupled to 5 connectors.

11. The interface cable of claim 5, wherein said second interface cable is coupled to 5 connectors.

12. The interface cable of claim 1, wherein said interface cable is interconnected to a computer system.

13. The interface cable of claim 1, wherein said interface cable is further comprised of a power distribution system.

14. A computer component interface comprising:

a flexible cable having a central region;

a plurality of connectors attached to said flexible cable;

a plurality of computer component cards, each supporting a computer component and a connector, a given connector on a computer component card being connected to a respective one of said connectors on said flexible cable;

a controller circuit card having a connector attached to one of said plurality of connectors on said flexible cable, at said central region thereof, said controller circuit card having a plurality of traces for carrying signals to each of said computer component cards, wherein at least some of said traces are of different lengths and said lengths are selected to complement corresponding transmission line lengths on said flexible cable; and a fixture supporting said flexible cable, said computer component card and said controller circuit card in an accessible configuration.

* * * * *

UNITED STATES PATENT AND TRADEMARK OFFICE
CERTIFICATE OF CORRECTION

PATENT NO. : 5,967,796
DATED : October 19, 1999
INVENTOR(S) : Hartfiel, et al.

It is certified that error appears in the above-identified patent and that said Letters Patent is hereby corrected as shown below:

ABSTRACT, line 6, please change "connection" to --connector--.

Column 5, line 66, please change "0.025" to --.025--.

Signed and Sealed this

Thirtieth Day of January, 2001

Attest:

Q. TODD DICKINSON

*Attesting Officer*     *Director of Patents and Trademarks*